United States Patent
Larimore

(10) Patent No.: US 8,898,040 B2
(45) Date of Patent: Nov. 25, 2014

(54) METHOD AND SYSTEM FOR EMPIRICAL MODELING OF TIME-VARYING, PARAMETER-VARYING, AND NONLINEAR SYSTEMS VIA ITERATIVE LINEAR SUBSPACE COMPUTATION

(75) Inventor: Wallace E. Larimore, McLean, VA (US)

(73) Assignee: Adaptics, Inc., McLean, VA (US)

(*) Notice: Subject to any disclaimer, the term of this patent is extended or adjusted under 35 U.S.C. 154(b) by 866 days.

(21) Appl. No.: 12/875,456

(22) Filed: Sep. 3, 2010

(65) Prior Publication Data

US 2011/0054863 A1 Mar. 3, 2011

Related U.S. Application Data

(60) Provisional application No. 61/239,745, filed on Sep. 3, 2009.

(51) Int. Cl.
| | |
|---|---|
| G06F 17/10 | (2006.01) |
| G06G 7/48 | (2006.01) |
| G05B 13/02 | (2006.01) |
| G06F 17/50 | (2006.01) |
| G06F 17/18 | (2006.01) |

(52) U.S. Cl.
CPC ........ *G06F 17/5018* (2013.01); *G06F 2217/16* (2013.01); *G06F 17/18* (2013.01); *G06F 9/00496* (2013.01)
USPC ............... 703/2; 703/1; 703/7; 703/8; 700/31

(58) Field of Classification Search
CPC ............................. G06F 17/18; G06F 17/5095
USPC .............................................................. 703/2
See application file for complete search history.

(56) References Cited

U.S. PATENT DOCUMENTS

| | | | | |
|---|---|---|---|---|
| 5,465,321 | A  * | 11/1995 | Smyth | 706/20 |
| 6,173,240 | B1 * | 1/2001 | Sepulveda et al. | 703/2 |
| 6,349,272 | B1 | 2/2002 | Phillips | |
| 7,082,388 | B2 * | 7/2006 | Omotani | 703/8 |
| 7,493,240 | B1 * | 2/2009 | Feng et al. | 703/2 |
| 7,536,282 | B1 * | 5/2009 | Lansford et al. | 702/197 |
| 7,840,389 | B2 * | 11/2010 | Gallet et al. | 703/1 |
| 7,881,815 | B2 * | 2/2011 | Srinivasan et al. | 700/31 |
| 8,346,693 | B2 * | 1/2013 | Al-Duwaish et al. | 706/21 |
| 2002/0129038 | A1 * | 9/2002 | Cunningham | 707/200 |

(Continued)

OTHER PUBLICATIONS

A Generalized Likelihood Ratio Approach to the Detection and Estimation of Jumps in Linear Systems; Alan S. Willsky et al; EEE Transactions on Automatic Control, Feb. 1976, pp. 108-112.*

(Continued)

*Primary Examiner* — Akash Saxena
(74) *Attorney, Agent, or Firm* — Maier & Maier, PLLC

(57) ABSTRACT

Methods and systems for estimating differential or difference equations that can govern a nonlinear, time-varying and parameter-varying dynamic process or system. The methods and systems for estimating the equations may be based upon estimations of observed outputs and, when desired, input data for the equations. The methods and systems can be utilized with any system or process that may be capable of being described with nonlinear, time-varying and parameter-varying difference equations and can used for automated extraction of the difference equations in describing detailed system or method behavior for use in system control, fault detection, state estimation and prediction and adaptation of the same to changes in a system or method.

3 Claims, 6 Drawing Sheets

(56) References Cited

U.S. PATENT DOCUMENTS

| | | | |
|---|---|---|---|
| 2003/0125644 A1* | 7/2003 | Hamamoto et al. | 600/587 |
| 2005/0021319 A1 | 1/2005 | Li et al. | |
| 2005/0114098 A1* | 5/2005 | Nagahara | 703/2 |
| 2006/0001673 A1* | 1/2006 | Brand | 345/582 |
| 2007/0028220 A1* | 2/2007 | Miller et al. | 717/124 |
| 2008/0126028 A1* | 5/2008 | Chu et al. | 703/2 |
| 2009/0210202 A1* | 8/2009 | Feng et al. | 703/2 |
| 2010/0225390 A1* | 9/2010 | Brown et al. | 330/149 |
| 2011/0054863 A1* | 3/2011 | Larimore | 703/2 |
| 2012/0109600 A1* | 5/2012 | Saeed et al. | 703/2 |
| 2013/0013086 A1* | 1/2013 | Macarthur et al. | 700/29 |
| 2013/0030554 A1* | 1/2013 | Macarthur et al. | 700/29 |

OTHER PUBLICATIONS

Subspace Identification of Linear Parameter Varying Systems With Innovation-Type Noise Models; Paulo Lopes dos Santos et al; pp. 1-3; Jun. 13, 2006.*

Robust Complexity Criteria for Nonlinear Regression in NARX Models; Jos De Brabanter et al; pp. 1-6; Apr. 18, 2003 (from doc properties).*

Identification of Flutter Parameters for a Wing Model; Carlos De Marqui Junior et al; J. of the Braz. Soc. of Mech. Sci. & Eng. Copyright 2006 by ABCM Jul.-Sep. 2006, vol. XXVIII, No. 3 pp. 339-346.*

Flutter Boundary Prediction of an Adaptive Smart Wing during Process of Adaptation; Yuji Matsuzaki* et al; Apr. 28, 2005; Smart Structures and Materials 2005: Smart Structures and Integrated Systems, edited by Alison B. Flatau, Proc. of SPIE vol. 5764 (SPIE, Bellingham, WA, 2005) pp. 203-213.*

Verdult, Vincent et al., Identification of Multivariable Linear Parameter-Varying Systems Based on Subspace Techniques, 39th IEEE Conference on Decision and Control, Dec. 15, 2000, pp. 1567-1572, vol. 2.

P. Lopes Dos Santos et al., Identification of Linear Parameter Varying Systems Using an Iterative Deterministic-Stochastic Subspace Approach, Proceedings of the European Control Conference, Jul. 5, 2007, pp. 4868-4869.

International Search Report dated May 26, 2011, from corresponding International Patent Application PCT/US2010/047832, Sep. 3, 2010—3 pages.

P. Lopes dos Santos, et al., "Identifciation of LPV Systems Using Successive Approximations", Proceedings of the European Control Conference, Jul. 2-5, 2007, pp. 4867-4873.

P. Lopes dos Santos, et al., "Subspace identification of linear parameter-varying systems with innovation-type noise models driven by general inputs and a measurable white noise time-varying parameter vector", International Journal of Systems Science, vol. 39, No. 9, Sep. 2008, pp. 897-911.

Larimore, W., Identification of nonlinear parameter-varying systems via canonical variate analysis, Jun. 17-19, 2013, American Control Conference (pp. 2247-2262), Washington, DC.

Larimore, et al., Identification of linear parameter-varying engine models, Jun. 17-19, 2013, American Control Conference (pp. 2274-2279), Washington, DC.

Buchholz, et al., Subspace identification of an aircraft linear parameter-varying flutter model, Jun. 17-19, 2013, American Control Conference (pp. 2263-2267), Washington, DC.

Extended European Search Report in PCT/US2010047832 dated Jan. 8, 2014.

* cited by examiner

| Quantity | Iteration 1 | Iteration k | Iteration k+1 |
|---|---|---|---|
| Expectation Step: | | | |
| Output Vector | $y_t$ | $y_t$ | $y_t$ |
| Input Vector $\tilde{u}_t$ | $\begin{bmatrix} u_t \\ \rho_t \otimes u_t \end{bmatrix}$ | $\begin{bmatrix} u_t \\ \rho_t \otimes \hat{x}_t^{[k-1]} \\ \rho_t \otimes u_t \end{bmatrix}$ | $\begin{bmatrix} u_t \\ \rho_t \otimes \hat{x}_t^{[k]} \\ \rho_t \otimes u_t \end{bmatrix}$ |
| Memory Estimates | $\hat{\tilde{m}}_t^{[1]}$ | $\hat{\tilde{m}}_t^{[k]}$ | $\hat{\tilde{m}}_t^{[k+1]}$ |
| Maximization Step: | | | |
| Parameter Estimates | $\hat{\Theta}^{[1]}$ | $\hat{\Theta}^{[k]}$ | $\hat{\Theta}^{[k+1]}$ |
| State Estimates | $\hat{x}_t^{[1]}$ | $\hat{x}_t^{[k]}$ | $\hat{x}_t^{[k+1]}$ |

Fig. 5

METHOD AND SYSTEM FOR EMPIRICAL MODELING OF TIME-VARYING, PARAMETER-VARYING, AND NONLINEAR SYSTEMS VIA ITERATIVE LINEAR SUBSPACE COMPUTATION

CROSS-REFERENCE APPLICATIONS

The present invention claims priority under 35 U.S.C. §120 to U.S. Provisional Patent Application No. 61/239,745, filed on Sep. 3, 2009, the disclosure of which is incorporated by reference herein in its entirety.

BACKGROUND

The modeling of nonlinear and time-varying dynamic processes or systems from measured output data and possibly input data is an emerging area of technology. Depending on the area of theory or application, it may be called time series analysis in statistics, system identification in engineering, longitudinal analysis in psychology, and forecasting in financial analysis.

In the past there has been the innovation of subspace system identification methods and considerable development and refinement including optimal methods for systems involving feedback, exploration of methods for nonlinear systems including bilinear systems and linear parameter varying (LPV) systems. Subspace methods can avoid iterative nonlinear parameter optimization that may not converge, and use numerically stable methods of considerable value for high order large scale systems.

In the area of time-varying and nonlinear systems there has been work undertaken, albeit without the desired results. This work is typical of the present state of the art in that rather direct extensions of linear subspace methods are used for modeling nonlinear systems. This approach expresses the past and future as linear combinations of nonlinear functions of past inputs and outputs. One consequence of this approach is that the dimension of the past and future expand exponentially in the number of measured inputs, outputs, states, and lags of the past that are used. When using only a few of each of these variables, the dimension of the past can number over $10^4$ or even more than $10^6$. For typical industrial processes, the dimension of the past can easily exceed $10^9$ or even $10^{12}$. Such extreme numbers result in inefficient exploitation and results, at best.

Other techniques use an iterative subspace approach to estimating the nonlinear teems in the model and as a result require very modest computation. This approach involves a heuristic algorithm, and has been used for high accuracy model identification in the case of LPV systems with a random scheduling function, i.e. with white noise characteristics. One of the problems, however, is that in most LPV systems the scheduling function is usually determined by the particular application, and is often very non-random in character. In several modifications that have been implemented to attempt to improve the accuracy for the case of nonrandom scheduling functions, the result is that the attempted modifications did not succeed in substantially improving the modeling accuracy.

In a more general context, the general problem of identification of nonlinear systems is known as a general nonlinear canonical variate analysis (CVA) procedure. The problem was illustrated with the Lorenz attractor, a chaotic nonlinear system described by a simple nonlinear difference equation. Thus nonlinear functions of the past and future are determined to describe the state of the process that is, in turn used to express the nonlinear state equations for the system. One major difficulty in this approach is to find a feasible computational implementation since the number of required nonlinear functions of past and future expand exponentially as is well known. This difficulty has often been encountered in finding a solution to the system identification problem that applies to general nonlinear systems.

Thus, in some exemplary embodiments described below, methods and systems may be described that can achieve considerable improvement and also produce optimal results in the case where a 'large sample' of observations is available. In addition, the method is not 'ad hoc' but can involve optimal statistical methods.

SUMMARY

One exemplary embodiment describes a method for utilizing nonlinear, time-varying and parameter-varying dynamic processes. The method may be used for generating reduced models of systems having time varying elements. The method can include steps for expanding state space difference equations; expressing difference equations as a linear, time-invariant system in terms of outputs and augmented inputs; and estimating coefficients of the state equations.

Another exemplary embodiment may describe a system for estimating a set of equations governing nonlinear, time-varying and parameter-varying processes. The system can have a first input, a second input, a feedback box and a time delay box. Additionally, in the system, the first input and the second input may be passed through the feedback box to the time delay box to produce an output.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

Advantages of embodiments of the present invention will be apparent from the following detailed description of the exemplary embodiments. The following detailed description should be considered in conjunction with the accompanying figures.

FIG. 5 is an exemplary table of equations used in an iterative algorithm.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Generally referring to exemplary FIGS. 1-6, methods and systems for empirical modeling of time-varying, parameter-varying and nonlinear difference equations may be described. The methods and systems can be implemented and utilized to provide for a variety of results and which may be implemented efficiently.

Figure 1:
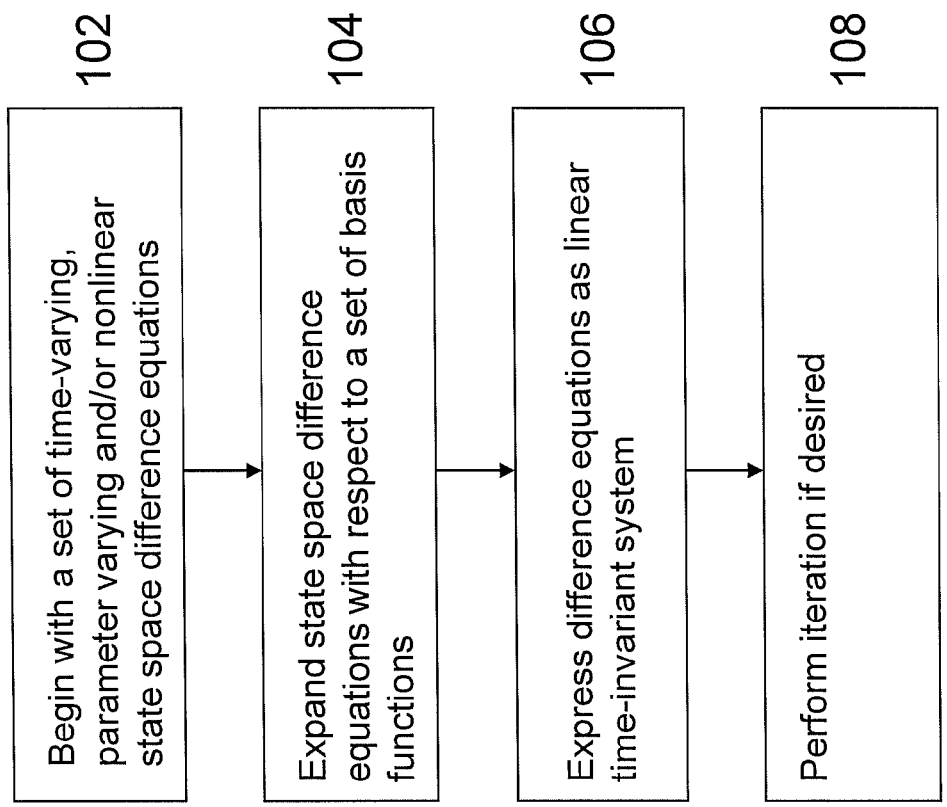
FIG. 1 is an exemplary flow chart for empirical modeling of time-varying, parameter varying and nonlinear difference equations.

As shown in exemplary FIG. 1, a flow chart of a methodology for empirical modeling of time-varying, parameter varying and nonlinear difference equations according to an exemplary embodiment may be shown. Here, in 102, a set of time-varying, parameter varying and, if desired, nonlinear state space difference equations may be utilized. In 104, the equations may then be expanded with respect to a chosen set of basis functions, for example nonlinear input-output equations may be expanded in polynomials in $x_t$ and $u_t$. Then, in 106, difference equations may then be expressed as a linear time-invariant, for example, in terms of outputs $y_t$ and augmented inputs $u_t$, which can include inputs $u_t$ and basis functions, for example polynomials, in inputs $u_t$ scheduling functions $p_t$ and states $x_t$.

Figure 2:
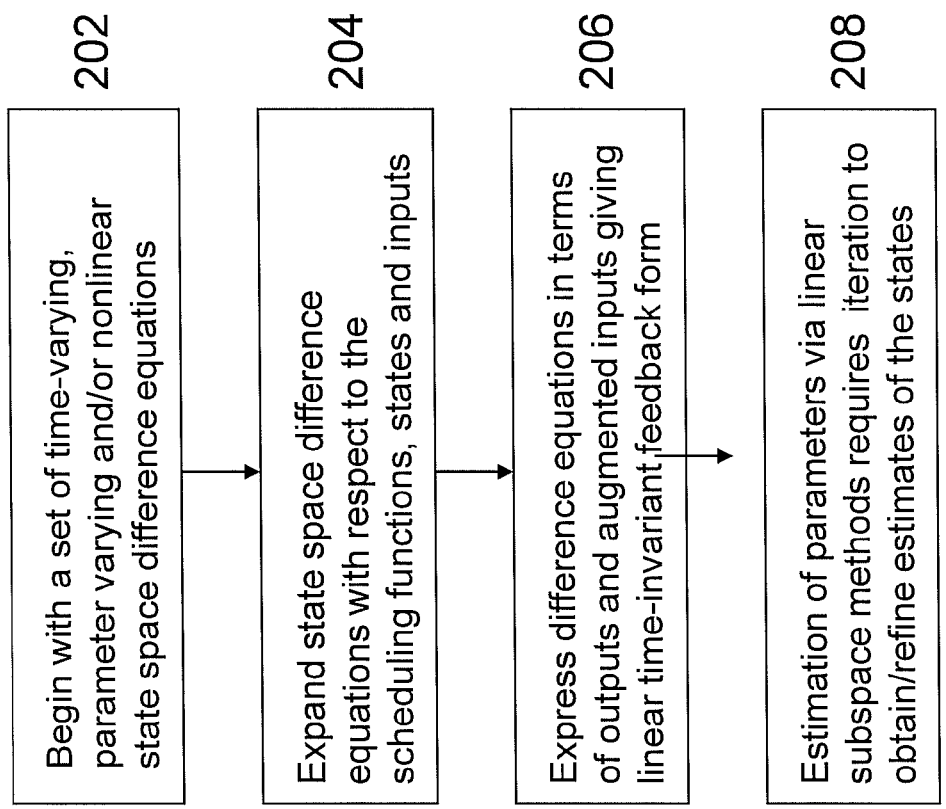
FIG. 2 is an exemplary flow chart showing a utilization of a linear, parameter varying system of difference equations.

Exemplary FIG. 2 may show an exemplary flow chart where a linear, parameter varying system of difference equations may be utilized. In this embodiment in 202 a set of linear parameter varying state space equations, such as those shown below as equation 1 and equation 2, may be used.

$$x_{t+1} = A_0 x_t + B_0 u_t + [A_1 \rho_t(1) + \ldots + A_s \rho_t(s)] x_t + [B_1 \rho_t(1) + \ldots + B_s \rho_t(s)] u_t \quad \text{(Equation 1)}$$

$$y_t = C_0 x_t + D_0 u_t + [C_1 \rho_t(1) + \ldots + C_s \rho(s)] x_t + [D_1 \rho_t(1) + \ldots + D_s \rho_t(s)] u_t \quad \text{(Equation 2)}$$

Then, in 204, the state space difference equations may be expanded with respect to polynomials in the scheduling function $p_t$, states $x_t$ and inputs $u_t$, for example as shown in equations 3 and 4 below.

$$x_{t+1} = A_0 x_t + B_0 u_t + [A_1 \ldots A_s](\rho_t \otimes x_t) + [B_1 \ldots B_s](\rho_t \otimes u_t) \quad \text{(Equation 3)}$$

$$y_t = C_0 x_t + D_0 u_t + [C_1 \ldots C_S](\rho_t \otimes x) + [D_1 \ldots D_S](\rho_t \otimes u_t) \quad \text{(Equation 4)}$$

Next, in 206, the difference equations can be expressed in terms of original outputs $y_t$ and augmented inputs $[u_t, (\rho_t \otimes x_t), (\rho_t \otimes u_t)]$ that are functions of $u_t$, $x_t$ and $p_t$. Difference equations can have linear time-invariant unknown $(A_0, [B_0 A_\rho B_\rho], C_0, [D_0 C_\rho D_\rho])$ coefficients that can be estimated, and as shown in equations 5 and 6 below.

$$x_{t+1} = A_0 x_t + [B_0 \quad A_\rho \quad B_\rho] \begin{bmatrix} u_t \\ \rho_t \otimes x_t \\ \rho_t \otimes u_t \end{bmatrix} \quad \text{(Equation 5)}$$

$$y_t = C_0 x_t + [D_0 \quad C_\rho \quad D_\rho] \begin{bmatrix} u_t \\ \rho_t \otimes x_t \\ \rho_t \otimes u_t \end{bmatrix} \quad \text{(Equation 6)}$$

Then, as shown in 208, the augmented inputs $[u_t, (\rho_t \otimes x_t), (\rho_t \otimes u_t)]$, and, in some exemplary embodiments, specifically $\rho_t \otimes x_t$, can involve an unknown state $x_t$ vector, so iteration may be utilized or desired. Thus, in such exemplary embodiments, iteration using an iterated algorithm, as described in further detail below, may be utilized.

Figure 3:
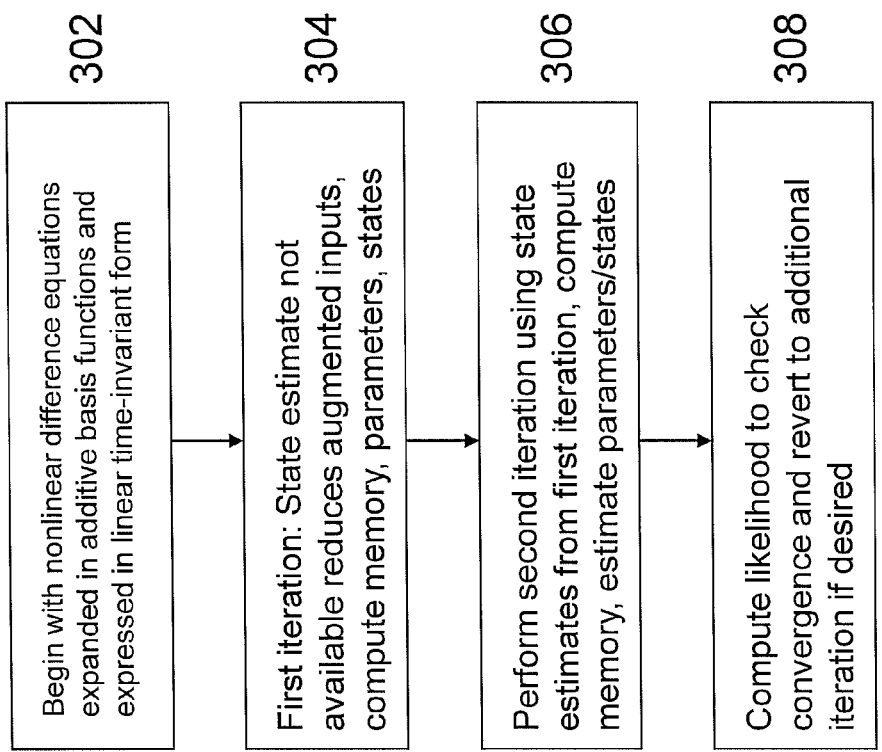
FIG. 3 is an exemplary flow chart showing an iterated algorithm that may be implemented for iterated subspace identification.

Exemplary FIG. 3 can show a flow chart of an iterated algorithm that may be implemented for iterated subspace identification. In this embodiment, and as seen in 302, nonlinear difference equations can be expanded in additive basis functions and expressed in linear time-invariant form with augmented inputs $u_t$. This can include, in some examples, nonlinear basis functions involving outputs, state and scheduling functions.

Then, in 304, the state estimate $\hat{x}_t^{[0]}$ is unknown that is equivalent to $(A_\rho \; C_\rho)$ term not in the LPV model, so the corresponding terms may be deleted from the set of augmented inputs $\tilde{u}_t$. The iterated algorithm may then be implemented using augmented inputs as the inputs and can compute estimates $\hat{\Theta}^{[1]}$ of the model parameters. Then, using, for example, a Kalman filter at the estimated parameter values $\hat{\Theta}^{[1]}$, the state estimates $\hat{x}_t^{[1]}$ can be computed along with the one-step prediction innovations. Then the likelihood function can be evaluated.

Next, in 306, an iteration k for k≥2 may be made. Here the state estimate $\hat{x}_t^{[k-1]}$ may be initialized for all t. The iterative algorithm may then be implemented using the augmented inputs as the inputs and can compute estimates $\hat{\Theta}^{[k]}$ of the parameters. Again, for example, using a Kalman filter at the estimated parameter values $\hat{\Theta}^{[k]}$, the state estimates $\hat{x}_t^{[k]}$ may be computed. The one-step prediction innovations may also be made and the likelihood $\rho(Y_{1:N}|\tilde{U}_{1:N}; \hat{\Theta}^{[k]})$ may also be evaluated.

In 308 the convergence can be checked. Here the change in the values of the log likelihood function and the state orders between iteration k−1 and iteration k can be compared. If, in some examples, the state order is the same and the log likelihood function change is less than a chosen threshold $\epsilon$. This threshold in many examples may be less than one, for example 0.01, then the iterations may end or be stopped. Otherwise, where the value is above a chosen threshold $\epsilon$, step 306 above may be returned to and iteration k+1 may be performed. Following the performance of iteration k+1, the convergence may then be checked again.

In another exemplary embodiment, a different approach may be taken to directly and simply obtain optimal or desired estimates of the unknown parameters for the case of autocorrelated errors and feedback in the system using, for example, subspace methods developed for linear time-invariant systems. This may be done by expressing the problem in a different form that can lead to a desire to iterate on the state estimate; however, the number of iterations may be very low, and, to further simplify the system and its development, stochastic noise may be removed.

For example, consider a linear system where the system matrices are time varying functions of a vector of scheduling parameters $\rho_t = (\rho_t(1)\,\rho_t(2)\ldots\rho_t(s))^T$ of the forms as shown in the equations below:

$$x_{t+1} = A(\rho_t)x_t + B(\rho_t)u_t \qquad \text{(Equation 7)}$$

$$y_t = C(\rho_t)x_t + D(\rho_t)u_t \qquad \text{(Equation 8)}$$

For affine dependence on the scheduling parameters, the state space matrices can have the form of the following equations 9 through 12.

$$A(\rho_t) = A_0 + \sum_{i=1}^{s} \rho_t(i) A_i \qquad \text{(Equation 9)}$$

$$B(\rho_t) = B_0 + \sum_{i=1}^{s} \rho_t(i) B_i \qquad \text{(Equation 10)}$$

$$C(\rho_t) = C_0 + \sum_{i=1}^{s} \rho_t(i) C_i \qquad \text{(Equation 11)}$$

$$D(\rho_t) = D_0 + \sum_{i=1}^{s} \rho_t(i) D_i \qquad \text{(Equation 12)}$$

In the above equations, it may be noted that where the matrices on the left hand side are expressed as linear combinations $(1\ \rho_t(1)\ \rho_t(2)\ldots\rho_t(s))^T$ on the right hand side specified by the scheduling parameters $\rho_t$, which may be called an affine form. In further discussion, the notation will be used for the system matrix $A = [A_0\,A_1\ldots A_s] = [A_0\,A_\rho]$ and similarly for B, C, and D.

In some further exemplary embodiments, system identification methods for the class of LPV systems can have a number of potential applications and economic value. Such systems can include, but are not limited to, aerodynamic and fluid dynamic vehicles, for example aircraft and ships, automotive engine dynamics, turbine engine dynamics, chemical processes, for example stirred tank reactors and distillation columns, amongst others. One feature can be that at any given operating point $\rho_t$ the system dynamics can be described as a linear system. The scheduling parameters $\rho_t$ may be complex nonlinear functions of operating point variables, for example, but not limited to, speed, pressures, temperatures, fuel flows and the like, that may be known or accurately measured variables that characterize the system dynamics within possibly unknown constant matrices A, B, C and D. It may also be assumed that $\rho_t$ may be computable or determinable from the knowledge of any such operating point variables. For example LPV models of automotive engines can involve the LPV state space equations that explicitly express the elements of the vector $\rho_t$ as very complex nonlinear functions of various operating point variables. In some exemplary embodiments described herein, it may only be desired that the scheduling parameter $\rho_t$ may be available when the system identification computations are performed. This can be a relaxation of the real-time use or requirement for such applications as real-time control or filtering.

To simplify the discussion, the LPV equations can be written in time-invariant form by associating the scheduling parameter $\rho_t$ with the inputs $u_t$ and states $x_t$ as $$x_{t+1} = A_0 x_t + B_0 u_t + [A_1 \ldots A_s](\rho_t \otimes x_t) + [B_1 \ldots B_s](\rho_t \otimes u_t) \qquad \text{(Equation 13)}$$

$$y_t = C_0 x_t + D_0 u_t + [C_1 \ldots C_s](\rho_t \otimes x_t) + [D_1 \ldots D_s](\rho_t \otimes u_t) \qquad \text{(Equation 14)}$$

Here, $\otimes$ can denote the Kronecker product $M \otimes N$, defined for any matrices M and N as the partitioned matrix formed from blocks of i,j as $(M \otimes N)_{i,j} = m_{i,j} N$ with the i,j element of M denoted as $m_{i,j}$. Also, the notation $[M;N] = [M^T\,N^T]^T$ can be used for stacking the vectors or matrices M and N. Equations 13 and 14 above can then also be written as shown below in the formats of equations 15 and 16.

$$x_{t+1} = A_0 x_t + [\,B_0\ A_\rho\ B_\rho\,]\begin{bmatrix} u_t \\ (\rho_t \otimes x_t) \\ (\rho_i \otimes u_t) \end{bmatrix} \qquad \text{(15)}$$

$$y_t = C_0 x_t + [\,D_0\ C_\rho\ D_\rho\,]\begin{bmatrix} u_t \\ (\rho_t \otimes x_t) \\ (\rho_i \otimes u_t) \end{bmatrix} \qquad \text{(16)}$$

As discussed in more detail below, the above equations can be interpreted as a linear time-invariant (LTI) system with nonlinear feedback of $f_t = [(\rho_t \otimes x_t); (\rho_t \otimes u_t)]$ where the states $x_t$ and inputs $u_t$ can be multiplied by the time varying scheduling parameters $\rho_t$. The feedback $f_t$ inputs can now be considered as actual inputs to the LTI system. As shown in further detail below, the matrices $[A_\rho\,B_\rho; C_\rho\,D_\rho]$ of the LPV system description can be the appropriate quantities to describe the LTI feedback representation of the LPV system.

Further, the above equations may now be described as shown below in equations 17 and 18.

$$x_{t+1} = \tilde{A} x_t + \tilde{B} \tilde{u}_t \qquad \text{(17)}$$

$$y_t = \tilde{C} x_t + \tilde{D} \tilde{u}_t \qquad \text{(18)}$$

Thus for measurements of outputs $\tilde{y}_t = y_t$ and inputs $\tilde{u}_t = [u_t^T\,(\rho_t \otimes x_t)^T (\rho_t \otimes u_t)^T]^T$ the time-invariant matrices can be $(\tilde{A}, \tilde{B}, \tilde{C}, \tilde{D}) = (A_0, [B_0\,A_\rho\,B_\rho], C_0, [B_0\,C_\rho\,D_\rho])$ respectively. Also, in situations where $x_t$ in $\rho_t \otimes x_t$ may not be a known or measured quantity, a prior estimate of $x_t$ may be available or utilized and iterations may be used to obtain a more accurate or desired estimate of $x_t$.

In still further exemplary embodiments, an LPV system can be expressed as a linear time-invariant system with non-linear internal feedback that can involve the known parameter varying functions $\rho_t$. (see, Section 2.1 of Nonlinear System Identification: *A State-Space Approach*, Vincent Verdult, 2002, Ph.D. thesis, University of Twente, The Netherlands, the contents of which are hereby incorporated by reference in their entirety). In this exemplary embodiment the system matrices $P_i$ of rank $r_i$ may be factored for each i with $1 \leq i \leq s$ using a singular value decomposition, such as that shown in equation 19.

$$P_i = \begin{bmatrix} A_i & B_i \\ C_i & D_i \end{bmatrix} = \begin{bmatrix} B_{f,i} \\ D_{f,i} \end{bmatrix}[\,C_{z,i}\ D_{z,i}\,] \qquad \text{(Equation 19)}$$

The quantities may then be defined as the following, shown in equations 20 through 23.

$$B_f = [B_{f,1}\,B_{f,2}\ldots B_{f,s}] \qquad \text{(Equation 20)}$$

$$D_f = [D_{f,1}\,D_{f,2}\ldots D_{f,s}] \qquad \text{(Equation 21)}$$

$$C_z^T = [C_{z,1}^T\,C_{z,2}^T \ldots C_{z,s}^T] \qquad \text{(Equation 22)}$$

$$D_z^T = [D_{z,1}^T\,D_{z,2}^T \ldots D_{z,s}^T] \qquad \text{(Equation 23)}$$

Next, internal feedback in the LTI system $P_0=[A_0 B_0;C_0 D_0]$ may be considered with outputs $z_t+C_z x_t+D_z u_t$ and with nonlinear feedback from $z_t$ to $f_t=\rho_t \otimes z_t$ entering the LTI system $P_0$ state equations through the input matrices $B_f$ and $D_f$. The state equations for $x_{t+1}$ and $y_t$ of the feedback system may be shown below in equations 24 through 27.

$$x_t = A_0 x_t + B_o u_t + B_f f_t \quad \text{(Equation 24)}$$

$$y_t = C_0 x_t + D_o u_t + D_f f_t \quad \text{(Equation 25)}$$

$$z_t = C_z x_t + D_z u_t \quad \text{(Equation 26)}$$

$$f_t = [\rho_t \otimes z_t] \quad \text{(Equation 27)}$$

Figure 4:
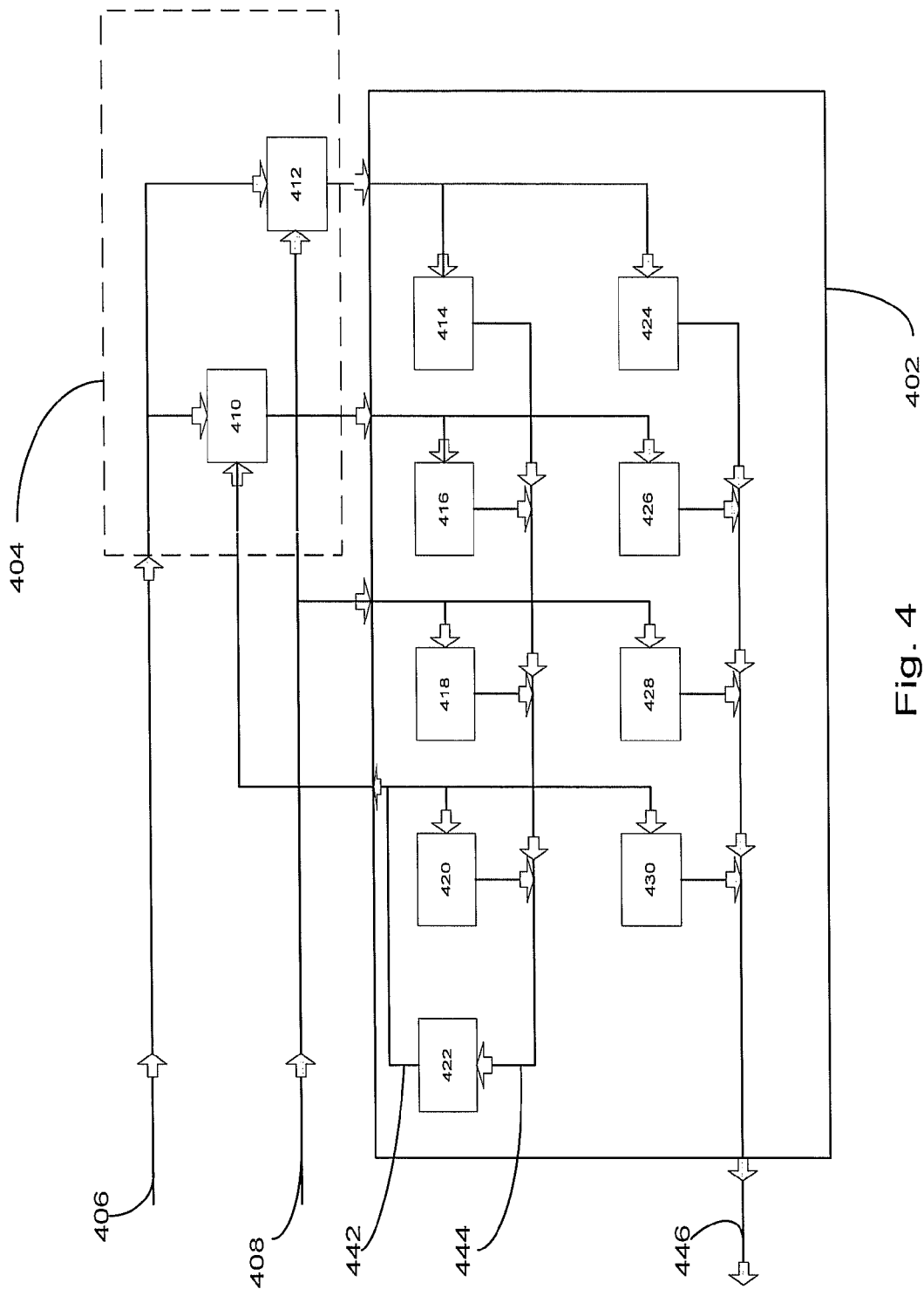
FIG. 4 is an exemplary schematic diagram of equations utilized for empirical modeling.

With respect to the above and referring now to exemplary FIG. 4, if it can be assumed that for any time t there is no effect of the feedback $f_t$ on the output $z_t$ as in the feedback structure shown in FIG. 4 and in equation 26, then there is no parameter dependence in the linear fractional transformation (LFT) description (see K. Zhou, J. Doyle, and K. Glover (1996), *Robust and Optimal Control*, Prentice-Hall, Inc., Section 10.2, the contents of which are hereby incorporated by reference in their entirety). As shown in FIG. 4, there may be a system 400 having two boxes, box 404 which may be a memory-less nonlinear feedback system and box 402 that can be a linear time-invariant system. Therefore, in some exemplary embodiments, the parameter dependence can become affine.

Exemplary FIG. 4 may be a schematic diagram of Equations 15 and 16. The state Equation 15 involves the upper boxes in 402 while the measurement Equation 16 involves the lower boxes in 402. $\Delta T$ 422 is a time delay of sample duration with the right hand side of Equation 15 at 444 entering 422 and the left hand side equal to state $x_{t+1}$ at leaving. This is a recursion formula similar to equations 14 and 15, so the time index can be changed from "t" to "t+1" for the figure before the start of the next iteration and continuing until entering boxes 420, 430 and 410. Scheduling parameters $\rho_t$ 406, inputs $u_t$ 408 and outputs $y_t$ 446 are variables The upper four boxes are multiplication from left to right by $B_0$ 418, $A_0$ 420, $B_\rho$ 414, $A_\rho$ 416, respectively. Similarly, the lower boxes are multiplication with A replaced by C and B replaced by D, depicted as $D_\rho$ 424, $C_\rho$ 426, $D_0$ 428 and $C_0$ 430. In the feedback box 404, the Kronecker products involving $\rho$, and successively $x_t$ and $u_t$ are formed in 410 and 412 respectively. The pairs of boxes aligned vertically are multiplying respectively from left to right the variables $x_t$, $u_t$, $\rho_t \otimes x_t$ and $\rho_t \otimes$. Additionally, arrows shown as touching a wire can symbolize addition. Further, $\Delta T$ 422 can represent a time delay block of duration $\Delta T$ that can act similar to a date line for this exemplary embodiment. Therefore the arrows in exemplary FIG. 4 indicate a time flow or an actual sequence of operations, the flow may start at 406, 408 and the output of 422 and proceed through the diagram. Upon reaching $\Delta T$ 422, all operations for sample t have been performed and, upon crossing through $\Delta T$ 422, sample time t+1 may begin. Thus, for example, upon leaving $\Delta T$ 422, the same quantity is maintained, but all of the time labels can be changed to t+1 throughout the process shown in exemplary FIG. 4.

Further, as shown below, this can be equivalent to the LPV form shown in equations 15 and 16 where the state equations can be linear in the scheduling parameter vector $\rho$.

In further exemplary embodiments and now using a definition of feedback defined as $f_t=\rho_t \otimes z$, as given by equations 26 and 27, the state equations for $x_{t+1}$ and $y_t$ may be as shown in equations 28 and 29 below.

$$x_{t+1} = A_0 x_t + B_0 u_t + \sum_{i=1}^{S} B_{f,i} \rho_t(i) C_{z,i} x_t + \sum_{i=1}^{S} B_{f,i} \rho_t(i) D_{z,i} u_k \quad \text{(Equation 28)}$$

$$y_t = C_0 x_t + D_0 u_t + \sum_{i=1}^{S} D_{f,i} \rho_t(i) C_{z,i} x_t + \sum_{i=1}^{S} D_{f,i} \rho_t(i) D_{z,i} u_k \quad \text{(Equation 29)}$$

Then, if equation 19 is used to define the above factors, equations 28 and 29 may be the same as equations 15 and 16.

Next, in a further exemplary embodiment, as the rank of $P_i$ may not be known, the outputs $z_t$ may be set as the states and inputs $z_t[x_t^T;u_t^T]^T$ that may subsequently be fed back through the static nonlinearity so that $f_t=[\rho_t \otimes x_t; \rho_t \otimes u_t]$. Then $\lfloor C_{z,i} D_{z,i} \rfloor = [I_{dim\,x} 0; 0 I_{dim\,u}]$ and equations 30 and 31 may be set as below.

$$P_i = \begin{bmatrix} A_i & B_i \\ C_i & D_i \end{bmatrix} = \begin{bmatrix} B_{f,i} \\ D_{f,i} \end{bmatrix} [C_{z,i} \ D_{z,i}] \quad \text{(Equation 30)}$$

$$= \begin{bmatrix} B_{f,i} \\ D_{f,i} \end{bmatrix} \begin{bmatrix} I_{dim\,x} & 0 \\ 0 & I_{dim\,u} \end{bmatrix} = \begin{bmatrix} B_{f,i} \\ D_{f,i} \end{bmatrix} \quad \text{(Equation 31)}$$

Thus, from the above, the LPV coefficient matrix $P_i=[A_i B_i;C_i D_i]$ can be the regression matrix of the left hand side state equation variables $(x_{t+1}; y_t)$ on the vector of nonlinear terms $[\rho_{i,t} x_t; \rho_{i,t} u_t]$. More generally, the LPV coefficient matrix $P_\rho=[A_\rho \ B_\rho; \ C_\rho \ D_\rho]=[B_f; \ D_f]$ can be the regression matrix of the left hand side state equation variables $(x_{t+1}; y_t)$ on the vector of nonlinear feedback terms $(\rho_t \otimes x_t; \rho_t \otimes u_t)$.

The LTI nonlinear feedback representation can solve a major barrier to applying existing subspace identification algorithms to the identification of LPV systems and overcomes previous problems with exponentially growing numbers of nonlinear terms used in other methods. For example, the above LTI nonlinear feedback representation can make it clear that nonlinear terms $(\rho_t \otimes x_t; \rho_t \otimes u_t)$ can be interpreted as inputs to an LTI nonlinear feedback system. Therefore it may be possible to directly estimate the matrices of the LTI system state space equations using linear subspace methods that can be accurate for processes with inputs and feedback. This can directly involve the use of the outputs $y_t$ as well as augmented inputs $[u_t;(\rho_t \otimes x_t; \rho_t \otimes u_t)]$ of the LTI nonlinear feedback system.

In another exemplary embodiment, LTI system matrices and state vectors may be determined following the reduction of an LTI subsystem of a nonlinear feedback system involving known scheduling functions and the state of the LTI subsystem. This embodiment can involve taking the iterative determination of both the LTI system state as well as the LTI state space matrices describing the LTI system.

One example may be to consider the polynomial system as a linear system in x and u with additional additive input terms in the higher order product terms so the additional inputs are $\rho_t \otimes x_t$ and $\rho_t \otimes u_t$. The scheduling variables $p_t$ are assumed to be available in real time as operating points or measured variables. If accurate estimates of the state $x_t$ are also available, then the problem could be only a direct application of the iterative algorithm for system identification. Since the variables $x_t$ are not available until after the solution of the system identification, a different approach may be utilized.

Thus, in an exemplary first step, an initial estimate of the state vector may be made. Here, system identification may be performed on the terms in the state equations involving the variables $x_t$, $u_t$ and $\rho_t \otimes u_t$ but not the variables $\rho_t \otimes x_t$. From this an approximation of the linear time invariant (LTI) part of the system giving estimates of $A_0$, $B_0$, $C_0$, $D_0$, $B_\rho$, and $D_\rho$ as well as estimates for the state vectors $X_{1,N}[1]=[x_1^T \; x_2^T \ldots x_N^T]^T$ may be obtained.

Then, in an exemplary second step, an iterate estimate of the state vectors may be made. Here the state vector $X_{1,N}^{[1]}$ can be used as an initial estimates for $x_t$ in the terms $\rho_t \otimes x_t$ in equations 15 and 16. Then the iterative algorithm can be applied to obtain an estimate of the system matrices A, B, C, and D and a refined estimate of $X_{1,N}^{[2]}$. Further, this step may then be iterated until a desired convergence is achieved.

Exemplary steps one through three above may therefore work with only a few iterations. Thus, in an exemplary manner in which the iterative algorithm can be used to address the previously known problem of LPV system identification. Thus, the following is an exemplary discussion of using the iterative algorithm in directly identifying the coefficients $F_{ij}$ and $H_{ij}$ of the additive polynomial expansions of the nonlinear difference equation functions $f(x_t,u_t,v_t)$ and $h(x_t,u_t,v_t)$, respectively. This may be a very compact and parsimonious parameterization for such a nonlinear system. The iterative algorithm described herein for linear time-invariant systems can therefore be used with only a very modest increase in computational requirements. Further, this exemplary use of the iterative algorithm to directly treat additive nonlinear terms in the state equations involving the state vector such as $\rho_t \otimes x_t$ as additional inputs. Since the state $x_t$ may not be initially known, this may facilitate iteration to estimate the state sequence starting with only the linear time invariant (LTI) part of the system, $A_0$, $B_0$, $C_0$ and $D_0$.

As seen in the above exemplary discussion following equations 13 and 14, a linear parameter varying system that can be affine in the scheduling variables $\rho_t$ can be expressed in time invariant form involving the additional input variables $\rho_t \otimes x_t$ and $\rho_t \otimes u_t$. Note that this involves nonlinear functions of $\rho_t$ with $x_t$ and $u_t$. The dynamic system can be linear time-invariant in these nonlinear functions of the variables.

In a further exemplary embodiment, the effect of additional inputs can be traced through the iterative algorithm. The exemplary steps outlined below may further be reflected in the table shown in exemplary FIG. 5 and the flow chart of exemplary FIG. 6.

Figure 6:
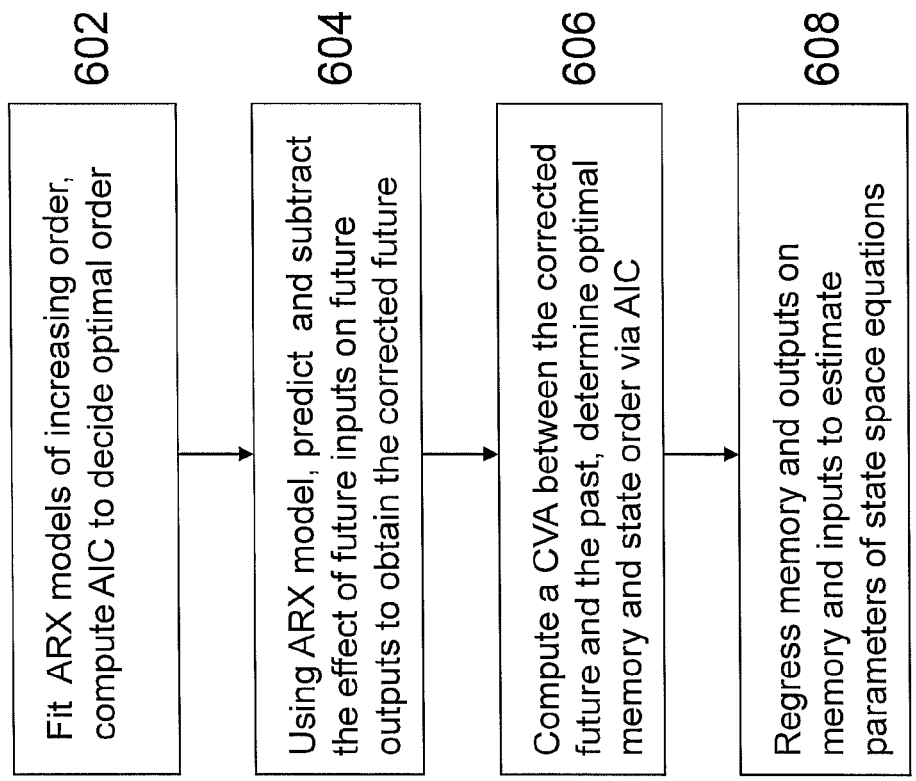
FIG. 6 is an exemplary flow chart showing steps executed in an algorithm.

Using elements 502 of exemplary FIG. 5 and in step 602 of exemplary FIG. 6, an autoregressive with exogenous input (ARX) model may be fitted corresponding to the FIG. 5 observations on iteration k with outputs $y_t$ and inputs $[u_t^T(\rho_t \otimes \hat{x}_t^{[k-1]})^T (\rho_t \otimes u_t)^T]^T$, where for k=1 the term $\rho \otimes \hat{x}_t^{[k-1]}$ may be absent from the inputs and further can be the equivalent to removing the term involving $(A_\rho C_\rho)$ from the LPV model structure. The ARX model fitting can have a linear regression problem that makes no prior assumptions on the ARX order other than the maximum ARX order considered. If the identified ARX order is near a maximum considered, the maximum ARX order considered can be doubled and the regression recomputed.

In exemplary step 604 a corrected future can be computed. The effect of future inputs on future outputs can be determined using the ARX model and subtracted from the outputs. The effect of this can be to compute the future outputs that could be obtained from the state at time t if there were no inputs in the future of time t.

In exemplary step 606, a canonical variate analysis (CVA) can be made or computed. Here, the CVA between the past and the corrected future can be computed. Again, the covariance matrices among and between the past and corrected future may also be computed. This may be similar to an SVD on the joint past-future covariance matrix which is of the order of the covariance of the past to obtain the ARX model. A result of this step is to obtain estimates of the states of the system called 'memory'.

In exemplary step 608, a regression using the state equation may be performed. The 'memory' from step 606 can be used in the state equations as if it were data and resulting estimates of the state space matrices and covariance matrices of the noise processes can be obtained. These estimates can be asymptotically maximum likelihood (ML) estimates of the state space model with no prior assumptions on the parameter values of the ARX or SS model.

Thus, using the above-described methodology, the ML solution in the iterative algorithm can be obtain in one computation based on the assumed outputs and inputs in iteration k, as shown in 504 of exemplary FIG. 5, with no iteration on assumed parameter values. The iteration is the result of refinement of the state estimate in the nonlinear term $(\rho_t \otimes \hat{x}_t^{[k-1]})^T$ that can be part of the assumed data in the iteration k (504).

Referring back to step 602, the ARX model fitting, the dimension of the augmented outputs is increased from dimu to dimua=dimu+dimp(dimx+dimu). To fit the ARX model, the ARX order lagp identified can be substantially higher due to the nonlinear input terms and depending on the statistically significant dynamics present among the output and augmented input variables. The computation can involve computation of an SVD on the data covariance matrix that is dimension of the dimua*lagp where lagp is the maximum ARX order considered. The computation that may be utilized for the SVD is of the order of 60*(dimua*lagp)$^3$, so the computation increases proportional to (dimp(dimx+dimu)/dimu)$^3$.

Therefore, one consequence of augmenting the system inputs by the nonlinear terms $\rho_t \otimes x_t$ and $\rho_t \otimes u_t$ may be to increase the past by a factor dimp(dimx+dimu)/dimu, and to increase the computation by this factor cubed. Depending on the particular dimensions of $u_t$, $x_t$, and $\rho_t$, this can be very significant, however there is no exponential explosion in the number of terms or the computation time. The LPV subspace algorithm of this invention still corresponds to subspace system identification for a linear time-invariant system and, in addition, because of the nonlinearity of the terms $[u_t^T(\rho_t \otimes x_t)^T (\rho_t \otimes u_t)^T]^T$ involved the state estimates $X_t$, iteration on the estimate of the system states until convergence can be desired or, in some alternatives, required.

Another factor to be considered is that the result of the CVA in exemplary step 606 is the computation of an estimate, denoted as $m_t$, of the state sequence $x_t$. The symbol 'm' is used as in the word 'memory' to distinguish it from the actual state vector and various estimates of the state vector as used in the EM algorithm discussed below. The estimate $\hat{m}_t$ in combination with the maximization step of the EM algorithm can be shown to be a maximum likelihood solution of the system identification problem for the case of a linear time-invariant system. In that case, the global ML solution can be obtained in only one iteration of the algorithm. This may be different with the EM and gradient search methods that almost always utilize many iterations. The CVA estimate $m_t$ may actually be an estimate of the state sequence for the system with parameters equal to the maximum likelihood estimates in the case of LTI systems and large sample size. This is different from the usual concept of first obtaining the ML parameter estimates and then estimating the states using a Kalman filter. Not only is the optimal state sequence for the ML parameters obtained in a single iteration, the optimal state order may also be determined in the process. In the usual ML approach, it can be desired or, in some alternatives, required to obtain the ML estimates for each choice of state order and then proceed to hypothesis testing to determine the optimal state order.

In another exemplary embodiment, the convergence of the iterative algorithm for the case of LPV may be described. In this embodiment, a substantially similar approach may be taken for other forms of nonlinear difference equations.

For any iterative algorithm, two issues may typically arise: (1) does the algorithm always converge, and (2) at what rate does it converge. In the computational examples considered, the iteration k on the estimated states $\hat{x}_t^{[k]}$ can be very rapid, for example half a dozen steps. Thus it may be shown herein that the iterative algorithm can be closely related to the class of EM algorithms that can be shown to always converge, under an assumption on the LPV system stability. Also, the rate of convergence can be computed to be geometric. This latter result is unique since the EM algorithm typically makes rapid early progress but becomes quite slow in the end. The reason for the rapid terminal convergence of the LPV algorithm will be discussed in further detail. Issues of initialization, stability and convergence will be elaborated below.

Additionally, the methods and systems described herein may be discussed in the context of the EM algorithm as there can be some parallelism between the two. To show the convergence of the LPV algorithm, the development in Gibson and Ninness (2005), denoted as GN below and incorporated by reference herein in its entirety (S. Gibson and B. Ninness, "Robust maximum-likelihood estimation of multivariable dynamic systems," *Automatica*, vol. 41, no. 5, pp. 1667-1682, 2005) will be discussed with various modifications made that are appropriate for the LPV algorithm. All equation numbers from Gibson and Ninness (2005) will include GN following the number in the paper GN, for example (23GN).

In this exemplary embodiment, the replacements that can be made in the GN discussion to obtain the LPV algorithm may be as follows: replace the LTI state equations with the LPV state equations and, for the missing data, replace the state estimate from the Kalman smoother with the 'memory' vector $m_t$ in the iterative algorithm. The consequence of this can be significant because for linear systems as in GN the iterative algorithm described herein can obtain the global ML parameter estimates in one step in large samples. On the other hand, for linear systems it may take the EM algorithm many iterations to obtain the ML solution.

Replacing the LTI model with the LPV model replaces the state space model equation 11GN by the LPV equations (15) and (16). This can produce a number of modifications in the equations of Lemma 3.1 since $u_t$ and (A, B, C, D) in GN is replaced by $[u_t^T(\rho_t \otimes x_t)^T(\rho_t \otimes u_t)^T]^T$ and $(A_0, [B_0 A_\rho B_\rho], C_0, [B_0 C_\rho D_\rho],)$ respectively. So the 'data' includes the vector $\rho_t \otimes x_t$ where the state vector $x_t$ is not available.

To execute iteration k as shown in 504 of exemplary FIG. 5, a straight forward approach involving the EM algorithm could be used. The 'missing data' would include state vector $x_t$ as the missing data. (See S. Gibson, A. Wills, and B. Ninness (2005), "Maximum likelihood parameter estimation of bilinear systems", IEEE Trans. Automatic Control, Vol. 50, No. 10, pp. 1581-2005, the contents of which are hereby incorporated by reference in their entirety). Then we could proceed for the case of a bilinear system that involves a term $u_t \otimes x_t$ that may be completely analogous to $\rho_t \otimes x_t$ for the LPV algorithm. But such an EM approach can, on occasion, result in the typical slow convergence behavior of EM algorithms near the maximum.

Therefore, instead the LPV algorithm may be used and can result in a rapid convergence. Thus, in this exemplary embodiment, instead of specifying the 'missing data' as the estimate of the Kalman smoother, the subspace approach can specify the CVA state estimate $m_t$ or 'memory', as the missing data. The memory $m_t$ is the estimate of the state vector obtained by a canonical variate analysis between the corrected future and the past obtained in exemplary step 606 of the iterative algorithm using the input and output vectors specified in FIG. 5. This may be similar to a Kalman filter state estimate at the global ML parameter estimates associated with the output and input data at iteration k rather than a Kalman smoother state estimate at the last estimated parameter value. One difference can occur because the CVA method expresses the likelihood function in terms of the corrected future conditioned on the past so that estimates of memory $m_t$ may depend only on the output and input data and their distribution depends on the ML estimates associated with the output and input data used in iteration k rather than smoothed estimates of the state. The actual conditional likelihood function $p_\theta(\xi_t/Z_t)$ of (26GN) with $\xi_t^T = [x_{t+1}^T y_t^T]$ and $z_t^T = [x_t^T u_t^T]$ is what can be involved in all of the EM computations. This can be the same likelihood function involved in the exemplary step 608 of the CVA algorithm of estimating the parameters of the state space equation as in Lemma 3.3 of GN. A difference is that in the exemplary step 608 of the CVA algorithm the expectation can be with respect to the true global ML estimates associated with the output and input data at iteration k whereas the GN estimate is an expectation with respect to the parameter value obtained in the previous iteration.

Further, the use of the LPV model and the choice of memory $m_t$ as the missing data in the expectation step of the algorithm can have the following consequence in GN. The basic theory in section 2, The Expectation-Maximization (EM) Algorithm of GN, needs no modification. In Section 3 of GN, the missing data is taken to be the CVA state estimates $\hat{m}_t^{[k]}$ based on the input and output quantities for iteration k in 504 of FIG. 5. So the $x_t$ in equations (22GN) through (28GN) can be replaced by $\hat{m}_t^{[k]}$.

Thus, Lemma 3.1 of GN holds but also can achieve the global ML estimate associated with the input-output vectors of exemplary FIG. 5 in one step. Lemma 3.2 of GN can be replaced by the iterative algorithm to obtain the memory estimates $\hat{m}_t^{[k]}$. Lemma 3.3 of GN is the same result as obtained in the iterative algorithm. An additional step may be used to compute $\hat{x}_t^{[k]}$ from the estimates $\Theta^{[k]}$ and the linear time-varying state equations given by the LPV state equations. This step may be desired to obtain the state estimate $\hat{x}_t^{[k]}$ for starting the next iteration $k_1$. This step can further allow for the iterative algorithm to produce $Q(\theta,\theta') \geq Q(\theta',\theta')$ with equality if and only $\hat{x}_t^{[k]} = \hat{x}_t^{[k+1]}$.

Then, in principle, the memory $\hat{m}_t^{[k]}$ could be used in place of the state estimate $\hat{x}_t^{[k]}$. In fact, $\hat{m}_t^{[k]}$ projected on the recursive structure of the state equations in equations (43GN) and (44GN) can produce the ML state estimates asymptotically and the corresponding optimal filtered state estimates $\hat{x}_t^{[k]}$. Thus the use of $\hat{m}_t^{[k]}$ instead of $\hat{x}_t^{[k]}$ in the computation of $\rho_t \otimes \hat{x}_t^{[k]}$ as part of the 'input data' can lead to essentially the same result except for some 'noise' in the results. But the computational noise can be avoided by the small additional computation of $\hat{x}_t^{[k]}$.

Also, in some exemplary embodiments, there may not be a need for a 'robust' improvement to the iterative algorithm described herein since it has been developed using primarily singular value decomposition computations to be robust and demonstrated as such for more than a decade. An exception is possibly the computation of the filtered state estimate $\hat{x}_t^{[k]}$ that could be implemented using the square root methods of Bierman (G. J. Bierman, *Factorization Methods for Discrete Sequential Estimation*, Academic Press (1977); republished by Dover, N.Y. (2006), the contents of which are hereby incorporated by reference in their entirety) if ill-conditioned LPV dynamic systems are to be solved to high precision.

In still another exemplary embodiment, it may be demonstrated that the LPV system identification algorithm may converge at a geometric rate near the maximum likelihood solution. Here the result for a linear system can be developed. The same approach may work for an LPV system, but the expressions below may be time dependent and can be of greater complexity.

Further, in order to simplify the derivation herein, the time invariant feedback from equations 17 and 18 can be considered with the substitution of notation $(\tilde{A}, \tilde{B}, \tilde{C}, \tilde{D}, \tilde{u}_t, u_t)$ by $(A, B, C, D, u_t, \tilde{u}_t)$. Thus, equation 17 and equation 18, with noise $v_t$ in innovation form may be written as equations 32 and 33 below.

$$x_{t+1} = Ax_t + Bu_t + Kv_t \quad \text{(Equation 32)}$$

$$y_t = Cx_t + Du_t + v_t \quad \text{(Equation 33)}$$

Thus, from the above, it may be seen that for measurements of outputs $y_t$ and inputs $u_t = [\tilde{u}_t^T (\rho_t \otimes x_t)^T (\rho_t \otimes \tilde{u}_u)^T]^T$, the time-invariant matrices are $(A, B, C, D) = (A_0, \{B_0 A_\rho B_\rho\}, C_0 [B_0 C_\rho D_\rho])$, respectively. Then, solving for $v_t$ in equation 33 and substituting in equation 32 produces equation 34 below.

$$x_{t+1} = Ax_t + Bu_t + K(y_t - Cx_t + Du_t) = (A-KC)x_t + (B-KD)u_t + Ky_t \quad \text{(Equation 34)}$$

Next, through recursively substituting the right hand side of equation 34 for $x_t$ can provide equation 35 below.

$$x_t = \sum_{i=1}^{\infty} (A-KC)^{i-1}[(B-KD)u_{t-i} + Ky_{t-i}] = \quad \text{(Equation 35)}$$

$$Jp_t(y_t, [\tilde{u}_t(\rho_t \otimes x_t), (\rho_t \otimes \tilde{u}_t)])$$

In equation 35, J can contain the ARX coefficients and $p_t$ can be the past output $y_t$ and inputs $u_t = [\tilde{u}_t, (\rho_t \otimes x_t), (\rho_t \otimes \tilde{u}_t)]$. Here $\tilde{u}_t$ can be the original inputs such that $u_t$ can include the nonlinear Kronecker product terms.

In a further exemplary embodiment, asymptotically for a large sample, J can be arbitrarily close to constant for a sufficiently large iteration k such that $$\Delta x_t^{[k]} = x_t^{[k+1]} - x_t^{[k]}$$

$$= Jp_t[0, 0, (\rho_r \otimes (x_t^{[k]} - x_t^{[k-1]}))0]$$

$$= L \begin{bmatrix} \rho_{t-1} \otimes \Delta x_{t-1}^{[k-1]} \\ \vdots \\ \rho_{t-lag} \otimes \Delta x_{t-lag}^{[k-1]} \end{bmatrix}$$

$$= L_t \begin{bmatrix} \Delta x_{t-1}^{[k-1]} \\ \vdots \\ \Delta x_{t-lag}^{[k-1]} \end{bmatrix},$$

where $L_t$ can be time varying and can have the time varying scheduling parameters $\rho_t$ combined with terms L. Also, if $\rho_t$ for all t is bounded, $L_t$ will be similarly bounded.

Now, when writing the state sequence in block vector form as $X_{1:N}{}^i = \text{vec}[x_{1:N}{}^i \ldots x_1{}^i]$ where the vec operation can stack the columns of a matrix starting with left hand columns on top, the above result can imply that $$\begin{bmatrix} \Delta x_N^{[k]} \\ \vdots \\ \Delta x_{t-k}^{[k]} \\ \vdots \end{bmatrix} = \begin{bmatrix} 0 & L_{N-1} & \rightarrow & \rightarrow \\ 0 & \ddots & \cdots & \cdots \\ 0 & 0 & L_{N-k} & \rightarrow \\ 0 & 0 & 0 & \ddots \end{bmatrix} \begin{bmatrix} \Delta x_{tN-1}^{[k-1]} \\ \vdots \\ \Delta x_{N-1}^{[k-1]} \\ \vdots \end{bmatrix},$$

where $\rightarrow$ can mean that $L_{N-k}$ extends to the right. Using M to denote the upper triangular matrix can give the fundamental expression for the difference $\Delta X_{lag:N}{}^i$ between state sequences $X_{lag:N}{}^i$ at successive iterations k and k−1 as equation 36 below.

$$\Delta X_{lag+2:N}{}^i = M\Delta X_{lag+1:N-1}{}^{i-1} \quad \text{(Equation 36)}$$

From equation 36 it may then be seen that the terminal convergence rate of the iteration in the LPV case can be governed by M, in particular the largest singular value of M. The various blocks of M can thus be computed by $$(A - KC)^{i-1}(B - KD)_{\rho \otimes x} \begin{bmatrix} \rho_{N-1}(1) I_{dim\,x} \\ \vdots \\ \rho_{N-i}(dim\,p) I_{dim\,x} \end{bmatrix},$$

where the subscript $\rho \otimes x$ means to select the submatrix of B−KD with columns corresponding to the corresponding rows of $\rho \otimes x$ in $\tilde{u}_t$.

In some other exemplary embodiments, the convergence of the iterative linear subspace computation may be affected by the stability of the LPV difference equations and, more specifically, the stability of the LPV linear subspace system identification described herein. Because a set of time-invariant linear state space difference equations may be stable if and only if all of the eigenvalues of the state transition matrix are stable, for example the eigenvalues are less than 1. The LPV case is more complex, but for the purposes of this exemplary embodiment, the rate of growth or contraction per sample time can be given for each eigenvector component of the state vector $x_t$ by the respective eigenvalues of the LPV state transition matrix from equation 9 and now shown as equation 37 below.

$$A(\rho_t) = A_0 + \sum_{i=1}^{s} \rho_t(i) A_i \quad \text{(Equation 37)}$$

In equation 37, the matrices $A = (A_0 \; A_\rho) = (A_0 \; A_1 \ldots A_s)$ can be assumed to be unknown constant matrices. Therefore, it is apparent that the transition matrix $A(\rho_t)$ may be a linear combination $[1; \rho_t]$ of the matrices $A_i$ for $0 \le i \le s$. Therefore, for any choice of the matrices $A_i$ for $0 \le i \le s$, there can be possible values of $\rho_t$ that could produce unstable eigenvalues at particular sample times t. If or when this occurs only sporadically and/or for only a limited number of consecutive observation times, no problems or errors may arise.

In some other exemplary embodiments, for example in the k-th iterative computation of the subspace algorithm, only estimated values of the state sequence $\hat{x}_t^{[k]}$ and the matrices $\hat{A}_i^{[k]}$ for $0 \le i \le s$ may be used. Therefore, if large errors in the estimates of these quantities are possible or acceptable, then there can be a greater potential for unstable behavior. For example, there may be areas of application of more significant importance, such as including identification of aircraft wing flutter dynamics where the flutter dynamics may be marginally stable or even unstable with the vibration being stabilized by active control feedback from sensors to wing control surfaces. Then, in some other applications, it may be possible to guarantee that not any combination of scheduling parameters $\rho_t$, values of matrices $A_i$ and uncertainty could produce instabilities. Further to this, the stability of the transition matrix can provide a potential for issues and therefore further consideration could be desired.

In some further exemplary embodiments, instabilities can produce periods where the predicted system response can rapidly grow very large. For example, when the eigenvalues are all bounded less than 1, then the predicted system response can be bounded, whereas if estimation errors are large, for example, one of the eigenvalues is equal to 2 for a period of time, then the predicted response may double approximately every sample during that time. Thus if $10^{30} = (10^3)^{10} \cong (2^{10})^{10} = 2^{100}$, then in as few as 100 samples, 30 digits of precision could be lost in the computation which could then provide meaningless results.

Therefore, per the above, there may be conditions under which there may be considerable loss of numerical accuracy that can be associated with periods where the LPV transition matrix is unstable, for example with extended intervals of time. Further, the difficulty can lie in that the algorithm initialization and sample size since at the optimal solution with a large sample, the algorithm is stable and convergent. If it was possible to compute with infinite precision, then problems with illconditioning could be avoided; however, with 15 or 30 decimal place accuracy, for example, some real data sets such as for the aircraft wing flutter, can benefit from further consideration.

Therefore, some exemplary embodiments may deal with manners of correcting for or otherwise lessening any undesired effects that may result from algorithm instability. For example, if the state sequence $\hat{x}_t^{[k]}$ is sufficiently close to the optimum as based upon the terminal convergence results described previously, the iterative algorithm may be stable provided it is assumed that the LPV system is stable. Therefore, in some examples, large initial errors in the estimate $\hat{x}_t[1]$ can lead to an unstable computation.

In other examples, such as during time intervals when the scheduling parameter values cause significant instabilities in $A(\rho_t)$, some components of the $f_t|q_t$, the future outputs $f_t$ corrected for the effects of future inputs $q_t$, may become quite large. Therefore, in the computation of the covariance matrix of $f_t|q_t$, such large values can cause considerable illconditioning and loss in numerical precision.

In examples where the iterative algorithm and some other subspace methods permit the arbitrary editing of the times where the instabilities occur, outlier editing of unstable regions may be performed. For example, in the ARX covariance computation where the corrected future can be computed, the time intervals with significant instabilities can be determined and removed from the computation.

In examples dealing with experimental design, if the trajectory of the operating point variables can be specified, then the scheduling parameters can be scheduled to enhance the system identification in several ways. An initial region that can avoid computational instabilities can be chosen to obtain sufficiently accurate initial estimates of the LPV parameters (A, B, C, D). This can then be used in other regions to initialize the state estimate of the algorithm with sufficient accuracy that computational instabilities will not be encountered.

In the above examples, the removal of unstable outliers at each iteration can be the most general and robust procedure. As the estimated values of the state sequence $\hat{x}_t^{[k]}$ and LPV parameters improve with more iterations, the number of outliers can be expected to decrease until there is rapid terminal convergence. A counter example to this expectation is when the beginning of the scheduling parameters $\rho_t$ time history has little variation so that the LPV model for this part of the data is good for that portion of the data, but is a poor global model. Then, in the later part of the time history, there can be consideration variation in $\rho_t$ such that unstable behavior may result.

Additionally, in many potential exemplary applications of the methods and systems described herein, it can be expected that the proposed algorithm can perform much better than existing methods that presently are not feasible on industrial problems. Further, in many situations, it can be desired to design the experiment to obtain results of a desired fidelity for a specified global region of the operating space at as little cost in time and resources as possible. Because the iterative algorithm's linear subspace method is a maximum likelihood based procedure, designs can be developed for LTI system identification. Also, as it identifies a stochastic model with estimated disturbance models, including confidence bands on quantities such as dynamic frequency response functions, the required sample size and system input excitation can be developed with little prior information on the disturbance processes.

In some further exemplary embodiments, the LPV methods and systems described herein may be extended to nonlinear systems. For example, it may be shown that a number of complex and nonlinear systems can be expressed in an approximate LPV form that can be sufficient for application of the LPV subspace system identification methods described herein.

In one example, a general nonlinear, time varying, parameter varying dynamic system can be described by a system of nonlinear state equations, such as those shown in equations 38 and 39.

$$x_{t+1} = f(x_t, u_t, \rho_t, v_t) \qquad \text{(Equation 38)}$$

$$y_t = h(x_t, u_t, \rho_t, v_t) \qquad \text{(Equation 39)}$$

In equations 38 and 39, $x_t$ can be the state vector, $u_t$ can be the input vector, $y_t$ can be the output vector and $v_t$ can be a white noise measurement vector. In some exemplary embodiments, to deal with 'parameter varying' systems, the 'scheduling' variables $\rho_t$ that can be time-varying parameters can describe the present operating point of the system. Very general classes of functions $f(\cdot)$ and $h(\cdot)$ can be represented by additive borel functions that need not be continuous.

In a simplified manner, the case of functions admitting Taylor expansion as in Rugh, Section 6.3 (W. J. Rugh, *Nonlinear System Theory: The Volterra/Wiener Approach*. Baltimore, Md.: Johns Hopkins Univ. Press, 1981, the contents of which are hereby incorporated by reference in their entirety), where $\rho_t$ and $v_t$ may be absent can provide the following, as shown in equations 40 and 41.

$$x_{t+1} = \sum_{i=0}^{I} \sum_{j=0}^{J} F_{ij} x_t^{(i)} u_t^{(j)} \qquad \text{(Equation 40)}$$

$$y_t = \sum_{i=0}^{I} \sum_{j=0}^{J} H_{ij} x_t^{(i)} u_t^{(j)} \qquad \text{(Equation 41)}$$

In equations 39 and 40, the notation $x_t^{(i)}$ can be defined recursively as $x_t^{(i)} = x_t \otimes x_t^{(i-1)}$ and similarly for $u_t^{(j)}$.

Thus, equations 40 and 41 may be polynomial expansions of the nonlinear functions $f(\bullet)$ and $h(\bullet)$. Note that the nonlinear equations may involve nonlinear functions of relatively simple form such as the approximating polynomial equations that involve only sums of products that are readily computed for various purposes. However for empirical estimation of the coefficients in the presence of autocorrelated errors, the problem can become difficult for low dimensions of y, u, and x, even using subspace methods. For subspace methods, the matrix dimensions can grow exponentially with the dimension of the 'past' that can be used. This can occur in expanding equation 40 by repeated substitution into $x_t^{[k]}$ on the right hand side of the state equation 40 with $x_t$ on the left hand side of equation 40. Thus the entire right hand side of equation 40 with t replaced by t−1 can be raised to the power lagp, the order of the past typically selected as the estimated ARX model order. For a relatively low order past, and low dimensions of $x_t$ and $u_t$, the number of additive terms can increase exponentially.

However, in a further exemplary embodiment and following Rugh the equations 39 and 40 can be converted through Carleman bilinearization to bilinear vector differential equations in the state variable as shown in equation 42:

$$x_t \otimes = [x_t^{(1)}; x_t^{(2)}; \ldots x_t^{(J)}]; \quad \text{(Equation 42)}$$

and the input power and products variables as shown in equation 43.

$$u_t \otimes = [u_t^{(1)}; u_t^{(2)}; \ldots u_t^{(J)}]; \quad \text{(Equation 43)}$$

In a further exemplary embodiment, equation 40, which expresses the state-affine form, can then be rewritten as equations 44 and 45, below.

$$x_{t+1} \otimes = A(x_t \otimes \otimes u_t \otimes) + Bu_t \otimes \quad \text{(Equation 44)}$$

$$y_t = C(x_t \otimes \otimes u_t \otimes) + Du_t \otimes \quad \text{(Equation 45)}$$

Next, it may be assumed that the coefficient matrices (A, B, C, D) may be linear functions of scheduling parameters $\rho_t$, denoted as $(A(\rho_t), B(\rho_t), C(\rho_t) D(\rho_t))$ and in state-affine form as in equations 9 through 12. The scheduling parameters $\rho_t$ may be nonlinear functions of the operating point or other known or accurately measured variables. For example, since the inputs $u_t \otimes$ are multiplicative and can be assumed to be known in real time or accurately measured, they can be absorbed into the scheduling parameters $\rho_t$, thereby possibly decreasing their dimension. The bilinear equations can then become those shown in equations 46 and 47 below.

$$x_{t+1} \otimes = A(\rho_t) x_t \otimes + B(\rho_t) u_t \otimes \quad \text{(Equation 46)}$$

$$y_t = C(\rho_t) x_t \otimes + D(\rho_t) u_t \otimes \quad \text{(Equation 46)}$$

Equations 46 and 47 are in explicitly LPV form. Therefore, for functions $f(x_t, u_t, \rho_t, v_t)$ and $h(x_t, u_t, \rho_t, v_t)$ that may be sufficiently smooth and for which there may exist a well defined power series expansion in a neighborhood of the variable, there can exist an LPV approximation of the process.

Thus, with the absorption of the inputs $u_t \otimes$ into the scheduling parameter $\rho_t$, the equations may be linear time varying and, in some instances, may have a higher dimension $\rho_t$. This can show the dual roles of inputs and scheduling parameters and how they may be interchangeable in a variety of manners and, for example, their difference may be their rate of variation with time. The knowledge of scheduling can therefore often be derived from the underlying physics, chemistry or other fundamental information. LPV models can therefore be considered, on occasion, as graybox models insofar as they may be able to incorporate considerable global information about the behavior of the process that can incorporate into the model how the process dynamics can change with operating point.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of reducing aircraft wing flutter by extending subspace identification methods to linear parameter varying (LPV) and nonlinear parameter varying systems with general scheduling functions, comprising:

sensing, with a sensor, wing flutter on an aircraft;

storing sensed wing flutter data on a memory;

performing at least one of a nonlinear and linear autoregressive with inputs ((N)ARX) model fitting with one of a predetermined autoregressive with inputs (ARX) model and a predetermined nonlinear ARX (NARX) model to the stored wing flutter data, the fitting comprising:

performing a parameter estimation using stored aircraft wing flutter input and output data determined from a predetermined iteration of an algorithm for subspace identification with a processor, at least one of a set of ARX models of increasing order with a specified maximum order or a set of linear regression problems in terms of NARX models of increasing order and monomial degrees with a specified maximum order and degree, comprising;

performing a model comparison, with a processor, to compute an Akaike's Information Criterion (AIC) of model fits for at least each ARX order and each NARX order and degree;

selecting a model that minimizes the AIC for at least one of a set of predetermined ARX models with a minimum AIC and a set of predetermined NARX models with a minimum AIC, wherein if more than one model achieves the desired minimum AIC, then selecting the ARX model or NARX model that further minimizes the number of estimated parameters that is also computed in the AIC computation;

performing a state space model fitting of a state space dynamic model of wing flutter that is parametric in its scheduling parameters, with a processor, using the ARX or NARX model selected as minimizing AIC, the state space model fitting comprising;

performing a corrected future calculation, by a processor, the corrected future calculation determining one or more corrected future outputs of wing flutter data through prediction and subtraction of an effect of one or more future inputs of wing flutter data on future outputs of the algorithm;

determining estimates of states with values whose elements are ordered as their predictive correlation for the future by performing a canonical variate analysis (CVA), with a processor, between corrected future outputs and past augmented inputs;

selecting one of a state order that minimizes the AIC or the lowest order of state orders that minimize the AIC;

inputting the estimates of states into one or more state equations;

performing a linear regression calculation on the one or more state equations to determine matrix coefficients of the state equations, and providing a dynamic model of aircraft wing flutter in the form of state equations with linear parameter varying matrix coefficients as functions of the scheduling parameters to extend subspace identification methods to LPV and nonlinear parameter varying systems with general scheduling functions.

2. The method of reducing aircraft wing flutter by extending subspace identification methods to linear parameter varying (LPV) and nonlinear parameter varying systems with general scheduling functions, of claim 1, wherein the ARX model fitting has a linear regression problem that assumes a maximum ARX order to be considered.

3. The method of reducing aircraft wing flutter by extending subspace identification methods to linear parameter varying (LPV) and nonlinear parameter varying systems with general scheduling functions of claim 1, wherein the fitting of the ARX models further comprises:

a specified ARX order lagp wherein, for the specified ARX order lagp, and for every time t greater than lagp, the prediction of outputs $y_t$ using an autoregression of past outputs $v_{t-i}$ for $0<i<\text{lagp}+1$, and an exogenous moving average comprising past inputs $u_{t-i}$, and further augmented past inputs $\rho_{t-i} \otimes u_{t-i}$ and augmented state estimates $\rho_{t-i} \otimes x_{t-i}$ augmented respectively by Kronecker products that are similarly time shifted past scheduling functions $\rho_{t-i}$ for $-1<i<\text{lagp}+1$.

\* \* \* \* \*